US006876905B2

United States Patent
Farley et al.

(10) Patent No.: US 6,876,905 B2
(45) Date of Patent: Apr. 5, 2005

(54) AIRCRAFT DATA TRANSMISSION SYSTEM FOR WIRELESS COMMUNICATION OF DATA BETWEEN THE AIRCRAFT AND GROUND-BASED SYSTEMS

(75) Inventors: Rod J. Farley, Yorba Linda, CA (US); Joseph J. Renton, Orange, CA (US)

(73) Assignee: System and Software Enterprises, Inc., Anaheim, CA (US)

( * ) Notice: Subject to any disclaimer, the term of this patent is extended or adjusted under 35 U.S.C. 154(b) by 98 days.

(21) Appl. No.: 10/294,850

(22) Filed: Nov. 14, 2002

(65) Prior Publication Data

US 2003/0130769 A1 Jul. 10, 2003

Related U.S. Application Data

(60) Provisional application No. 60/331,861, filed on Nov. 19, 2001.

(51) Int. Cl.[7] .............................. B64C 7/00; G08G 5/02; G01S 5/02
(52) U.S. Cl. ................................. 701/3; 701/1; 701/24; 701/36; 244/1 R; 340/500; 340/948; 340/945; 455/66.1
(58) Field of Search ............................ 701/3, 1, 24, 36; 244/1 R; 340/945, 948, 500; 455/66.1

(56) References Cited

U.S. PATENT DOCUMENTS

| | | | |
|---|---|---|---|
| 6,167,238 A | * | 12/2000 | Wright ..................... 455/66.1 |
| 6,173,159 B1 | * | 1/2001 | Wright et al. ............. 455/66.1 |
| 6,181,990 B1 | | 1/2001 | Grabowsky et al. |

\* cited by examiner

*Primary Examiner*—William A. Cuchlinski, Jr.
*Assistant Examiner*—Olga Hernandez

(57) ABSTRACT

A device to enable automatic wireless communication with an aircraft after the aircraft has parked at a gate. A terminal cellular bridge (TCB) enables the retrieval of data from, and the sending of data to the aircraft by an internet service provider. The internet service provider uses the Internet to send data to and receive data from a remotely located network operation center and data warehousing center. The data warehousing center provides secure data storage and retrieval, and data processing. The network operations center provides for system control and monitoring.

17 Claims, 2 Drawing Sheets

AIRCRAFT DATA TRANSMISSION SYSTEM FOR WIRELESS COMMUNICATION OF DATA BETWEEN THE AIRCRAFT AND GROUND-BASED SYSTEMS

CROSS REFERENCE TO RELATED APPLICATIONS

This application claims the benefit of provisional application Ser. No. 60/331,861 filed Nov. 19, 2001 for A System And Method For Acquiring, Processing, Storing, And Presenting Data Accumulated Through In-Flight Entertainment Systems. This entire provisional application is incorporated herein by reference.

The present application is also related to non-provisional application Ser. No. 10/241,381 filed Sep. 9, 2002 for A System And Method For Acquiring, Storing, Processing, And Presenting Data Accumulated Through An In-flight Aircraft Server. This entire non-provisional application is incorporated herein by reference.

BACKGROUND OF THE INVENTION

1. Field of the Invention

The present invention relates generally to improvements in data transfer to and from aircraft computer systems, and more particularly pertains to new and improved interface circuitry between aircraft carried computer systems and a cellular communication link.

2. Description of the Prior Art

In the field of downloading flight data information from an aircraft, it has been the practice to employ cellular infrastructure to transmit the downloaded data, acquired from avionics and various sensors within the aircraft, to a land-based receiver which then transmits the received data by way of the internet or standard telephone lines to a data reception storage and analysis unit. A system of this type is described in U.S. Pat. No. 6,181,990 granted Jun. 30, 2001 to John F. Grabowsky, et al. for Aircraft Flight Data Acquisition And Transmission System. The patent describes a system that starts communication between the aircraft and base station upon aircraft landing. The transmission of data between the aircraft and a cellular base station while the aircraft is still taxiing to the gate, is not seen as satisfactory in that interference with other aircraft equipment is still possible. This problem has been overcome by the present invention.

SUMMARY OF THE INVENTION

Wireless communication with an aircraft that has landed and is parked at an airport is facilitated by a terminal cellular bridge that receives data gathered by an in-flight entertainment server and transmits the data to an internet service provider which then routes the data over the Internet to a data warehousing center for storage and processing. A network operation center is in communication with the internet service provider and the warehousing center by way of the Internet. The terminal cellular bridge only begins to transmit data after the aircraft is parked at the gate by sensing a certain trigger event, such as the opening of the aircraft door, for example. Besides sending data to an internet service provider, the terminal cellular bridge may also receive data from the internet service provider for use by the in-flight entertainment server.

BRIEF DESCRIPTION OF THE DRAWINGS

The exact nature of this invention as well as its objects and its advantages will become readily apparent upon consideration of the following specification when considered in conjunction with the accompanying drawings in which like reference numerals designate like parts throughout the figures thereof and wherein.

DETAILED DESCRIPTION OF THE PREFERRED EMBODIMENTS

Figure 1:
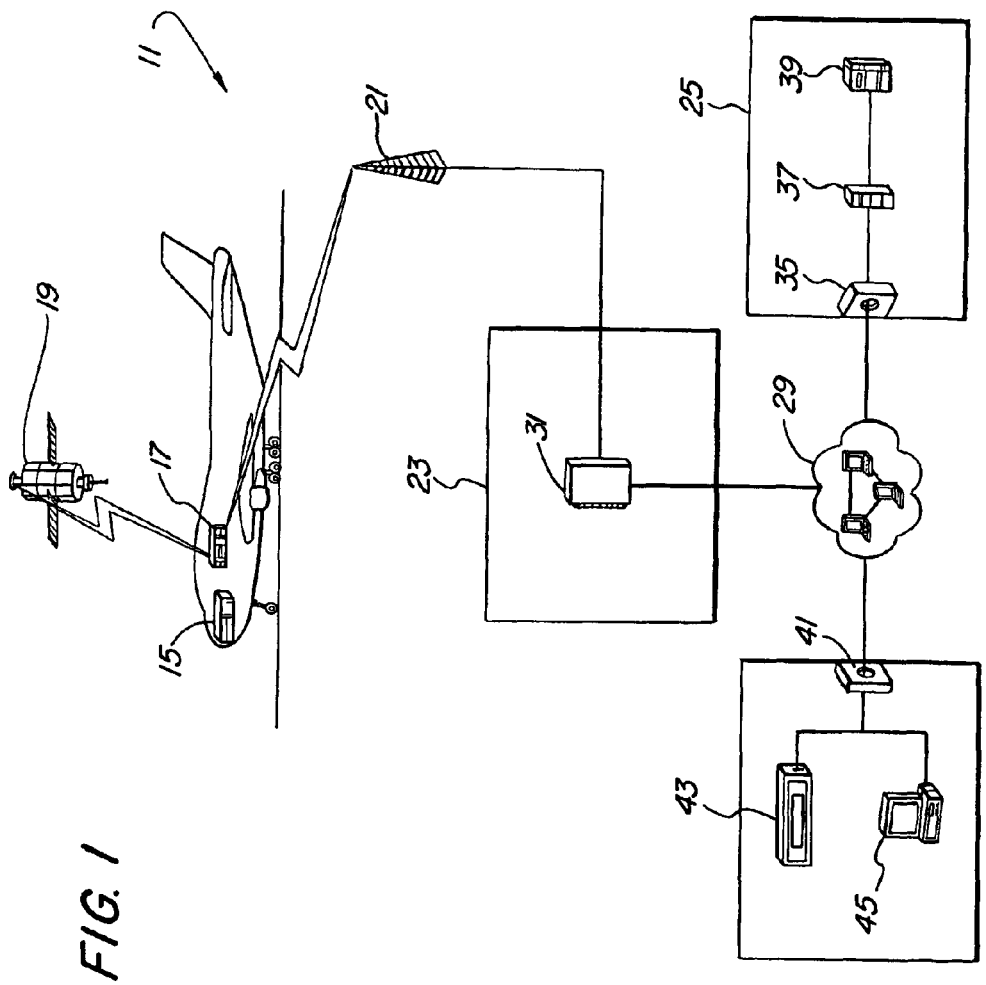
FIG. 1 is a schematic illustration in partial block diagram form of a system in which the present invention may be utilized.

FIG. 1 illustrates a system 11 in which the terminal cellular bridge (TCB) 17 of the present invention is utilized to facilitate communication between an in-flight entertainment server (IFE) 15 located on the aircraft 13 and a cellular tower 21 located in the vicinity of the airport. The cellular tower is connected to an internet service provider (ISP) 23. In addition to transmitting information to the cellular tower 21 and receiving information from the cellular tower 21, the TCB 17 can also receive information from a global positioning system (GPS) satellite 19 which allows the TCB 17 to determine the coordinate location of the aircraft with respect to a map of the world, for example.

The cellular telecommunication infrastructure which includes the cellular tower 21 and a cellular telephone module (more clearly shown in FIG. 2), is preferably a global system for mobile communication (GSM) type system. With a GSM system, the TCB 17 will be able to communicate with a land-based cellular station at the greatest number of airports globally.

Data exchange between the TCB 17 and the IFE server 15 is preferably accomplished via an aircraft data bus (ethernet, token ring, or serial). The TCB 17, upon being instructed to begin, aggregates and compresses the data received from the IFE server along with any location data provided by the GPS module in the TCB 17 based on the information received from the GPS satellite 19. The TCB then initiates a call to the nearest Internet service provider (ISP) 23, in the proximity of the airport at which the aircraft 17 has landed. The ISP 23 normally includes an internet bridge 31 that provides the connection to the Internet 29. The ISP 23 receives the call and routes the call and the subsequent received data into the internet 29 and to the data warehousing center 25. The data warehousing center 25 comprises a database server with backup storage 39 connected to a web server 37 which is connected through firewall 35 to Internet 29.

The system 11 also includes a network operation center 27 which provides for system control and monitoring. The network operation center also hosts those systems required for interfacing into standard business functions such as billing, customer service, etc.

The data warehousing center 25, besides providing for secure data storage and retrieval for data transmitted to and from an aircraft 17, also provides data processing. The data warehousing center 25 processes the stored data to generate user-friendly presentations of data to customers via the Internet 29.

The ISP is also used for uploading data related to the in-flight entertainment (IFE) server to the TCB 17 for subsequent transfer to the IFE server 15. Examples of information that could be uploaded are configuration parameters for the in-flight entertainment system, other flight related data such as the aircraft seating configuration, the route of the aircraft, schedules for entertainment data during the upcoming flight, restrictions on content for specific routes, billing information for onboard shopping, revised price lists for goods, currency exchange rates, goods available for purchase duty free, arrival gate information, and connecting flight terminal locations. In addition, the in-flight entertainment server could also receive by way of this wireless link application software updates, survey questions, games, cached web content, menus for presentations of IFE data to passengers, entertainment title lists, data encryption keys, or built-in test control information.

Other information that may be transferred by the TCB 17, which is not related to the IFE server function, could be information related to the aircraft flight such as identification of the cabin crew, the cockpit crew, the passenger manifest, or the status of an onboard inventory.

Although the system of FIG. 1 describes a communication system as related to an in-flight entertainment system server 15, the TCB unit 17 can communicate with other non-IFE aircraft systems, such as CIDS found in the Air Bus and CMC found in Boeing aircraft, for example.

Figure 2:
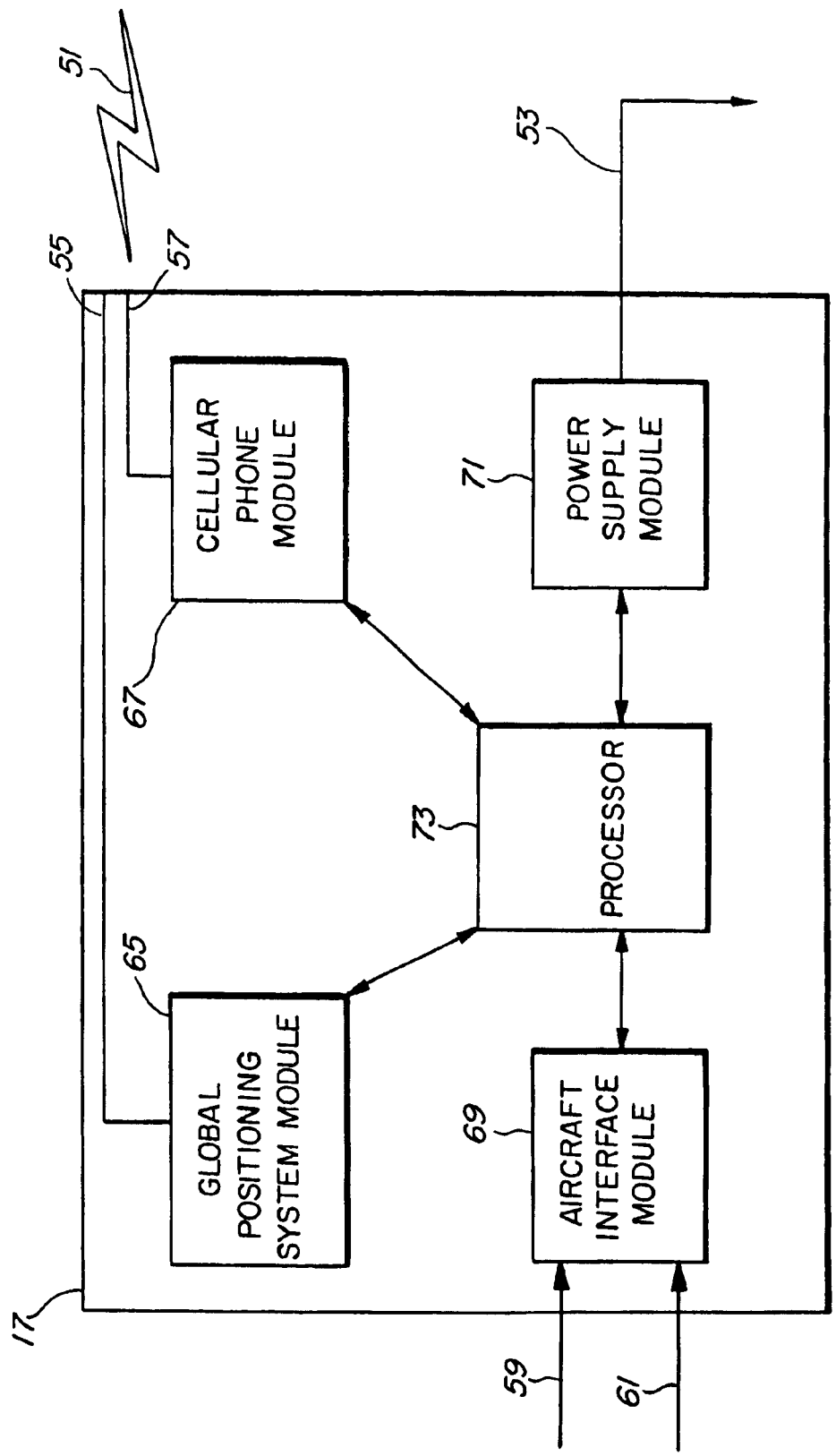
FIG. 2 is a block diagram illustration of the construction of the invention.

The terminal cellular bridge (TCB) 17, as illustrated in FIG. 2, is the device that enables wireless communication between an aircraft and a land-based station, like the ISP 23. By utilizing a wireless link between the aircraft and a land-based station, significant cost savings are realized over a system that requires a real person to manually retrieve data from the IFE server 15, for example.

The preferred embodiment of the TCB 17, as illustrated in FIG. 2, utilizes an aircraft interface module 69 which functions to interpret aircraft state information, gather aircraft system information desired to be transmitted, and distribute received information to aircraft systems. Interface module 69 receives aircraft discrete sensor inputs, like aircraft door open signals, or parking brake applied signals on line 59. Aircraft data bus interface information is received on line 61.

Preferably the interface module 69 has four 16550 compatible serial ports, two of which are internal and two external, configured to RS232, RS-485, or RS-422. It also has three discrete outputs, USB, token ring, and ethernet ports, and three discrete inputs.

The interface module 69 receives data from and supplies data to a control processor 73. Control processor 73 is preferably a pentium class processor having 32-bit CPU core with 100 MHz clock or greater. The processor is set up to perform the required data acquisition, aggregation, and distribution.

An optional global positioning system (GPS) module 65 having a GPS receiver is hooked up to a GPS antenna 55 that does not pierce the skin of the aircraft. The GPS module 65 determines the location of the aircraft globally and also provides accurate time and date information to the processor for communication.

Communication occurs by way of a cellular telephone module 67, which is essentially a wireless telephone that can send data across a local wireless network, as described. An antenna 57 hooked up to the cellular phone also does not pierce the skin of the aircraft.

A power supply module 71 is part of the TCB 17 and runs the modules of the TCB from available aircraft power connected to line 53. Preferably the power supplied is at 115 VAC.

The TCB 17 typically receives power when the aircraft pilot energizes the power input circuit connected to input 53 on the TCB. When powered up, the TCB 17 gathers data from the IFE server over the aircraft data bus 61 for transmission and delivers data previously received from the ISP 23 to the IFE server. Besides being connected to a power source, the TCB 17 is connected to receive control signals and operating parameters from the aircraft. As described above, the TCB receives discrete sensor input signals over line 59 from the aircraft when the passenger door opens, or the parking brake is applied, for example, that indicate the aircraft is parked at the gate. Other signals that could be used to indicate the aircraft is at the gate are wheel speed, cargo door open, ground power available, fuel door open, cargo lights on, and ACARS interface, for example. Upon receipt of this sensor input signal, the TCB begins to send data by way of cellular telephone module 67 over the wireless network.

The data that the TCB transmits comes from several different sources. The TCB gathers data about passenger usage of in-flight entertainment features, such as the use of telephone, audio, video, and game-playing systems. Other data that it gathers includes responses to surveys presented to passengers and logs containing web cache usage statistics. Additional information may be purchases by passengers as well as billing information. In addition, the TCB could gather and transmit data relating to the aircraft flight. This information includes, for example, software error status logs, software resets, hardware failure logs, hardware resets, and maintenance logs. Besides all this information, the TCB can use the information from the global positioning system module 65 to transmit the coordinate location of the aircraft along with the accurate time and date information.

The processor 73 combines the information from the GPS module, such as the location, time, and date information, and the information from the aircraft interface module, such as the aircraft system data, and prepares it for transmission. The cellular telephone module 67 then transmits the packaged data.

The cellular telephone module 67 may also receive data for the aircraft from the local cellular network. In such a case, the processor 73 packages the received aircraft system information and passes it to the interface module 69 for distribution to the aircraft system.

This wireless communication occurs only while the aircraft is parked at the gate and when the cabin doors are open, thereby not interfering with other avionic equipment and allowing the antennas to transmit through the open door. A break in the skin of the aircraft is thus not required. When the aircraft cabin doors are subsequently closed, and the parking brake is released, in preparation for taxiing to take off position, the TCB receives a signal on input line 59 that causes it to stop transmitting or receiving data. The TCB will then wait for the next trigger signal, a door open signal, or parking brake on signal, for example before going into its next transmission cycle. The TCB will continue to gather data from and distribute data to the aircraft unless it is powered down.

What is claimed is:

1. In an aircraft data communication system having an aircraft data acquisition system for gathering data about passenger usage of in-flight entertainment features, an aircraft data transmission system comprising:

a terminal cellular bridge on board each aircraft in communication with the aircraft data acquisition system and receiving control signals from the aircraft including a control signal that the aircraft is parked at the gate;

an internet service provider communicating with the terminal cellular bridge and routing data to and from the internet;

a data warehousing center communicating with the internet service provider over the internet; and a network operations center communicating with the data warehousing center over the internet;

whereby the terminal cellular bridge initiates a call to the nearest internet service provider upon receipt of the parked at the gate control signal.

2. The aircraft data communication system of claim 1, wherein the terminal cellular bridge comprises a cellular phone module for global system mobile communication.

3. The aircraft data communication system of claim 1, wherein the terminal cellular bridge includes a global positioning system.

4. The aircraft data communication system of claim 1, wherein the control signal is triggered by the opening of an aircraft door.

5. The aircraft data transmission system of claim 1, wherein the control signal is triggered by the parking brake being applied.

6. In an aircraft data transmission system having an in-flight entertainment data acquisition system, a terminal cellular bridge on each aircraft comprising:

an aircraft interface module for receiving data from the acquisition system and control signals from the aircraft including a control signal indicating the aircraft is parked at the gate;

a processor communicating with the aircraft interface module;

a cellular phone module communicating with the processor for transmitting data to or from the processor over a cellular phone network; and a power supply module for providing power to the modules of the terminal cellular bridge.

7. The terminal cellular bridge of claim 6, further comprising a global positioning system module communicating with the processor to provide the processor aircraft location information.

8. The terminal cellular bridge of claim 1, wherein the control signal is triggered by the opening of an aircraft door.

9. The terminal cellular bridge of claim 6, wherein the control signal is triggered by the parking brake being applied.

10. In an aircraft transmission system having an in-flight entertainment data acquisition system, a terminal cellular bridge on each aircraft, comprising:

an aircraft interface module for receiving data from the acquisition system and control signals from the aircraft;

a processor communicating with the aircraft interface module;

a cellular phone module communicating with the processor for transmitting data to or from the processor over a cellular phone network; and a power supply module for providing power to the modules of the terminal cellular bridge wherein the processor begins to gather data from and/or send data to the in-flight entertainment system upon power being applied.

11. In an aircraft transmission system having an in-flight entertainment data acquisition system, a terminal cellular bridge on each aircraft comprising:

an aircraft interface module for receiving data from the acquisition system and control signals from the aircraft wherein the aircraft interface module receives data about passenger usage of in-flight entertainment features;

a processor communicating with the aircraft interface module;

a cellular phone module communicating with the processor for transmitting data to or from the processor over a cellular phone network; and a power supply module for providing power to the modules of the terminal cellular bridge.

12. The terminal cellular bridge of claim 11, wherein the in-flight entertainment features data comprises passenger use of telephone, audio/video, and game playing systems.

13. The terminal cellular bridge of claim 11, wherein the in-flight entertainment features data comprises passenger responses to surveys.

14. The terminal cellular bridge of claim 11, wherein the in-flight entertainment features data comprises purchases by passengers along with billing information.

15. The terminal cellular bridge of claim 1, wherein the aircraft module receives a control signal that causes the cellular phone module in the terminal cellular bridge to become inactive.

16. The terminal cellular bridge of claim 15 wherein the control signal is triggered by an aircraft door closing.

17. The terminal cellular bridge of claim 15 wherein the control signal is triggered by an aircraft parking brake being released.

\* \* \* \* \*